(12) United States Patent
Mathew et al.

(10) Patent No.: US 12,079,468 B2
(45) Date of Patent: Sep. 3, 2024

(54) SYSTEMS AND METHODS FOR OPTIMIZING RENDERING FOR A SPACE-CONSTRAINED DISPLAY

(71) Applicant: The Toronto-Dominion Bank, Toronto (CA)

(72) Inventors: Sangeeta Mathew, Mississauga (CA); Anand Pandey, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/096,305

(22) Filed: Jan. 12, 2023

(65) Prior Publication Data

US 2024/0241637 A1    Jul. 18, 2024

(51) Int. Cl.
*G06F 3/04886*    (2022.01)
*G06F 3/0485*    (2022.01)

(52) U.S. Cl.
CPC ........ *G06F 3/04886* (2013.01); *G06F 3/0485* (2013.01)

(58) Field of Classification Search
CPC .............. G06F 3/04847; G06F 3/0488; G06F 3/04883; G06F 3/04817; G06F 3/017; G06F 3/0362; G06F 3/0482; G06F 3/04845; G06F 3/0485; G06F 9/451; G06F 1/163; G06F 3/04842; G06F 3/0481; G06F 3/0416; G06F 3/0484; G06F 2203/04808; G06F 16/9535; G06F 16/9566; G06F 21/316; G06F 21/6263; G06F 2221/2101; G06F 40/279; G06F 1/3203; G06F 1/3293; G06F 16/24578; G06F 16/248; G06F 16/535; G06F 16/55; G06F 16/29; G06F 16/9537; G06F 21/6254; G06F 16/2365; G06F 16/26; G06F 2203/04806; G06F 16/252; G06F 16/972; G06F 21/6245; G06F 21/10; G06F 16/319; G06F 16/438; G06F 16/447; G06F 16/951; G06F 18/2148; G06F 16/258; G06F 16/27; G06F 16/28; G06F 16/33; G06F 16/335; G06F 16/9024; G06F 16/90332; G06F 16/958; G06F 3/01; G06F 9/44505; G06F 9/453; G06F 9/45512; G06F 1/30; G06F 11/3438

See application file for complete search history.

(56) References Cited

U.S. PATENT DOCUMENTS

| | | |
|---|---|---|
| 10,566,090 B2 | 2/2020 | Ivanoff |
| 10,768,809 B2 * | 9/2020 | Kim ........................ H04L 51/04 |
| 11,144,895 B2 | 10/2021 | Brunner |
| 11,361,390 B2 | 6/2022 | Kohli |

(Continued)

FOREIGN PATENT DOCUMENTS

| | | |
|---|---|---|
| AU | 2020406041 | 1/2022 |
| EP | 1938571 | 7/2008 |

(Continued)

*Primary Examiner* — Rayeez R Chowdhury
(74) *Attorney, Agent, or Firm* — Marks & Clerk

(57) ABSTRACT

Systems and methods for processing data messages to determine a presentation mode to be used for displaying a prompt on a display with limited screen area. Messages are processed to determine a presentation mode and ranking, and then a prompt is displayed in a target area of the display that is visible with minimal user interaction.

19 Claims, 11 Drawing Sheets

(56) References Cited

U.S. PATENT DOCUMENTS

| | | | |
|---|---|---|---|
| 2003/0018724 A1* | 1/2003 | Mathewson, II | G06Q 10/107 709/206 |
| 2004/0125142 A1* | 7/2004 | Mock | G06F 9/451 715/765 |
| 2009/0287687 A1* | 11/2009 | Martire | G06Q 30/02 707/E17.084 |
| 2013/0227432 A1* | 8/2013 | Lin | H04M 1/72451 715/753 |
| 2014/0012743 A1* | 1/2014 | Hanson | G06Q 30/04 705/40 |
| 2014/0173602 A1* | 6/2014 | Kikin-Gil | G06Q 10/1097 718/100 |
| 2014/0189017 A1* | 7/2014 | Prakash | H04W 4/029 709/206 |
| 2015/0058345 A1* | 2/2015 | Mishra | G06F 16/29 707/737 |
| 2015/0149492 A1* | 5/2015 | Janakiraman | G06F 3/0482 707/758 |
| 2016/0292648 A1* | 10/2016 | Cowan | G06Q 50/01 |
| 2017/0024393 A1* | 1/2017 | Choksi | G06F 16/24578 |
| 2017/0109656 A1 | 4/2017 | Cook | |
| 2017/0185966 A1* | 6/2017 | Li | G06F 3/0482 |
| 2018/0197099 A1 | 7/2018 | Liang | |
| 2019/0148025 A1* | 5/2019 | Stone | G16H 20/17 705/2 |
| 2020/0342415 A1* | 10/2020 | Han | G06Q 10/1093 |
| 2021/0089860 A1 | 3/2021 | Heere | |
| 2021/0240787 A1 | 8/2021 | Miguel | |
| 2021/0303973 A1 | 9/2021 | Edwards | |
| 2022/0108292 A1 | 4/2022 | Terrell | |
| 2022/0164405 A1 | 5/2022 | Novakivsky | |
| 2022/0244825 A1 | 8/2022 | Hu | |
| 2022/0245530 A1 | 8/2022 | Bathe | |

FOREIGN PATENT DOCUMENTS

| | | |
|---|---|---|
| EP | 3479322 | 5/2019 |
| WO | 2017012426 | 1/2017 |

* cited by examiner

SYSTEMS AND METHODS FOR OPTIMIZING RENDERING FOR A SPACE-CONSTRAINED DISPLAY

TECHNICAL FIELD

The disclosed exemplary embodiments relate to computer-implemented apparatus, systems and methods for processing and displaying data and, in particular, processing and displaying data on space-constrained displays.

BACKGROUND

Many distributed or cloud-based computing clusters provide parallelized, fault-tolerant distributed computing and analytical protocols (e.g., the Apache Spark™ distributed, cluster-computing framework, the Databricks™ analytical platform, etc.) that facilitate real-time application of the adaptively trained machine learning processes, artificial intelligence processes, or fuzzy logic to input datasets or input feature vectors, to produce predictions or other output regarding the input datasets or feature vectors. These processes can involve large numbers of massively parallelizable vector-matrix operations, and the distributed or cloud-based computing clusters often include graphics processing units (GPUs) capable of processing thousands of operations (e.g., vector operations) in a single clock cycle and/or tensor processing units (TPUs) capable of processing hundreds of thousands of operations (e.g., matrix operations) in a single clock cycle.

In some cases, these processes may be used to predict a likelihood of an event occurring in the future, given certain existing information relevant to the prospective event. For instance, one of these techniques may be used to predict the likelihood of a specific action, given historical knowledge of past similar actions. With the increasing capability of distributed computing systems, it is now possible for large volumes of such predictions to be generated.

SUMMARY

The following summary is intended to introduce the reader to various aspects of the detailed description, but not to define or delimit any invention.

In at least one broad aspect, there is provided a computing device, the computing device comprising: a display; a network interface; a memory; and a processor coupled to the display, the network interface, and the memory, the processor configured to: receive via the network interface a data message comprising a plurality of predicted upcoming activities; process the plurality of predicted upcoming activities to determine a presentation mode is to be used for displaying a prompt regarding the plurality of predicted upcoming activities, wherein the prompt is an aggregated prompt generated based on the plurality of predicted upcoming activities; rank the plurality of predicted upcoming activities to prioritize an order of presentation within the prompt; and display the prompt on the display according to the presentation mode.

In some cases, the presentation mode designates a target area of the display for the prompt, and the target area is positioned within the display such that it is at least partially visible prior to receipt of a scroll input.

In some cases, the computing device includes a mobile device, and the display has a diagonal size of less than about 10".

In some cases, the mobile device includes one of a mobile phone, a tablet device and a smart watch.

In some cases, the presentation mode is a first presentation mode optimized for display of the prompt based on the plurality of predicted upcoming activities.

In some cases, the processor is further configured to rank the plurality of predicted upcoming activities based on a predetermined order of preference.

In some cases, the processor is further configured to rank the plurality of predicted upcoming activities based on an urgency level of each of the plurality of predicted upcoming activities.

In some cases, the processor is further configured to identify a prioritized predicted upcoming activity from the plurality of predicted upcoming activities, and the presentation mode is a second presentation mode optimized for display of the prompt based on the prioritized predicted upcoming activity.

In some cases, the processor is further configured to display a second prompt subordinate to the prompt, and the second prompt consists of historical prompts.

In another broad aspect, there is provided a method for displaying a prompt within a user interface, the method comprising: receiving a data message comprising a plurality of predicted upcoming activities; processing the plurality of predicted upcoming activities to determine a presentation mode is to be used for displaying a prompt regarding the plurality of predicted upcoming activities, wherein the prompt is an aggregated prompt generated based on the plurality of predicted upcoming activities; ranking the plurality of predicted upcoming activities to prioritize an order of presentation within the prompt; and displaying the prompt according to the presentation mode.

In some cases, the presentation mode designates a target area of a display for the prompt, wherein the target area is positioned within the display such that it is at least partially visible prior to receipt of a scroll input.

In some cases, the display includes a display of a mobile device, and the display has a diagonal size of less than about 10".

In some cases, the mobile device includes one of a mobile phone, a tablet device and a smart watch.

In some cases, the presentation mode is a first presentation mode optimized for display of the prompt based on the plurality of predicted upcoming activities.

In some cases, the ranking of the plurality of predicted upcoming activities is based on a predetermined order of preference.

In some cases, the ranking of the plurality of predicted upcoming activities is based on an urgency level of each of the plurality of predicted upcoming activities.

In some cases, the method further comprises identifying a prioritized predicted upcoming activity from the plurality of predicted upcoming activities, and the presentation mode is a second presentation mode optimized for display of the prompt based on the prioritized predicted upcoming activity.

In some cases, the method further comprises displaying a second prompt subordinate to the prompt, and the second prompt consists of historical prompts.

In another broad aspect, there is provided a system for displaying prompts in a user interface, the system comprising: a data processing server comprising a server memory, a server network interface, and a server processor, the server processor configured to: identify a plurality of predicted upcoming activities, and transmit a data message comprising the plurality of predicted upcoming activities; and a computing device comprising a display, a network interface, a memory, and a processor, the processor configured to carry out any of the methods described herein.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1A:
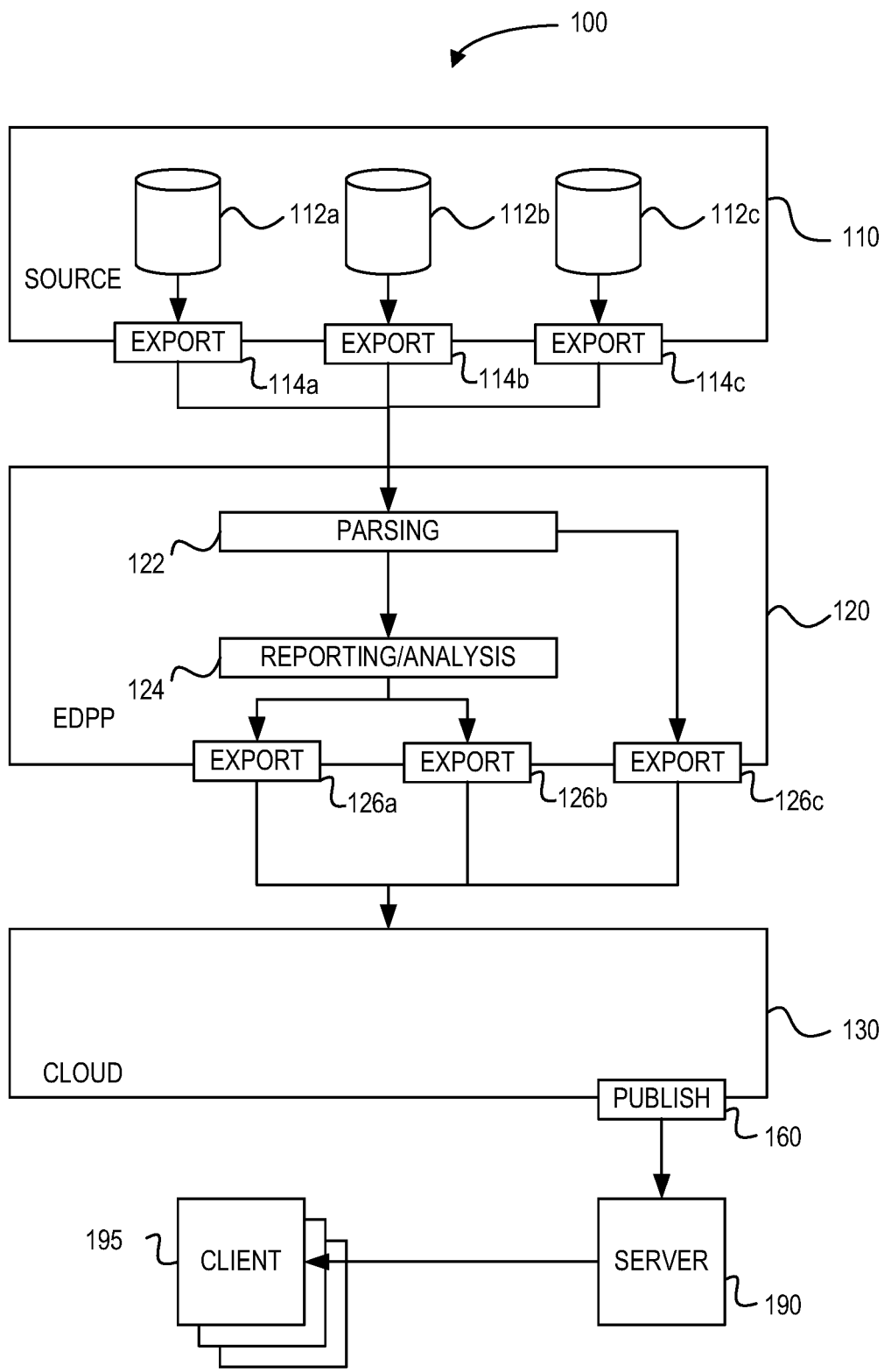
FIG. 1A is a schematic block diagram of a system in accordance with at least some embodiments.

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases. A sufficiently large organization may have hundreds of millions of records across these various databases, corresponding to tens of thousands, hundreds of thousands or even millions of customers.

This quantity and scope of confidential data represents a source of data to be used as input to compute predictions of future occurrences of events, such as customer interactions or non-interactions. Predictions can be computed using machine learning techniques, or other computing models such as fuzzy logic. Fuzzy logic is a form of logic in which the truth value of variables may be any real number between the integer values of 0 and 1 traditionally used in Boolean logic. Fuzzy logic offers the concept of partial truth, where a given truth value may range between completely true (e.g., "1") and completely false (e.g., "0").

With large volumes of data, the computational resources available in distributed or cloud-based computing systems may be used to generate predictions or inferences regarding these sets of data. For smaller volumes of data, personal or mobile devices may have sufficient computing power to generate predictions locally based on a subset of the available data. In some cases, models may be employed to predict a likelihood of an event occurring in the future, given certain existing information relevant to the prospective event. For instance, one model may be employed to predict the likelihood of a person taking a specific action, given historical or biographical knowledge of the person's activities.

Moreover, with the increasing computational and storage capability of both distributed computing systems and mobile devices, it is now possible for large volumes of such predictions to be generated. However, although the computational capacity of mobile devices may be ever-increasing, there is a physical limit to the size of the display in a mobile device. Correspondingly, there is a limit to the number of notifications that can be displayed simultaneously on the display of a mobile device.

Still further, many users will have a wide variety of possible upcoming activities. Therefore, to improve the usefulness of generated prompts, it may be desirable to aggregate upcoming activities that are related in some way. However, this can be complicated by the heterogeneous nature of some activities, and because they may originate from different sources that do not share the same schema.

The described embodiments provide, among other things, approaches for optimizing the display of relevant information to a user, given a space-constrained display.

In at least some embodiments, a computing device or system processes incoming information, such as notifications, and determines a presentation mode to be used for the display of a prompt. In a first presentation mode, the prompt focuses on a single activity, while in a second presentation mode, the prompt may provide aggregated information relating to multiple activities, which may be related. The activity or activities may relate to predictions of upcoming user activities. In at least some embodiments, a computing device receives a data message or notification comprising at least one predicted upcoming activity, processes the at least one predicted upcoming activity to determine which presentation mode to be used for displaying a prompt regarding the at least one predicted upcoming activity, and displays the appropriate prompt according to the selected presentation mode.

More particularly, upon receiving a data message, a user device processes the data message to identify the one or more predicted upcoming activity it contains, and to determine a presentation mode that is to be used for displaying a prompt regarding the one or more predicted upcoming activity. The prompt can then be displayed when the user activates the device or a particular app on the device for displaying the prompt.

Figure 6A:
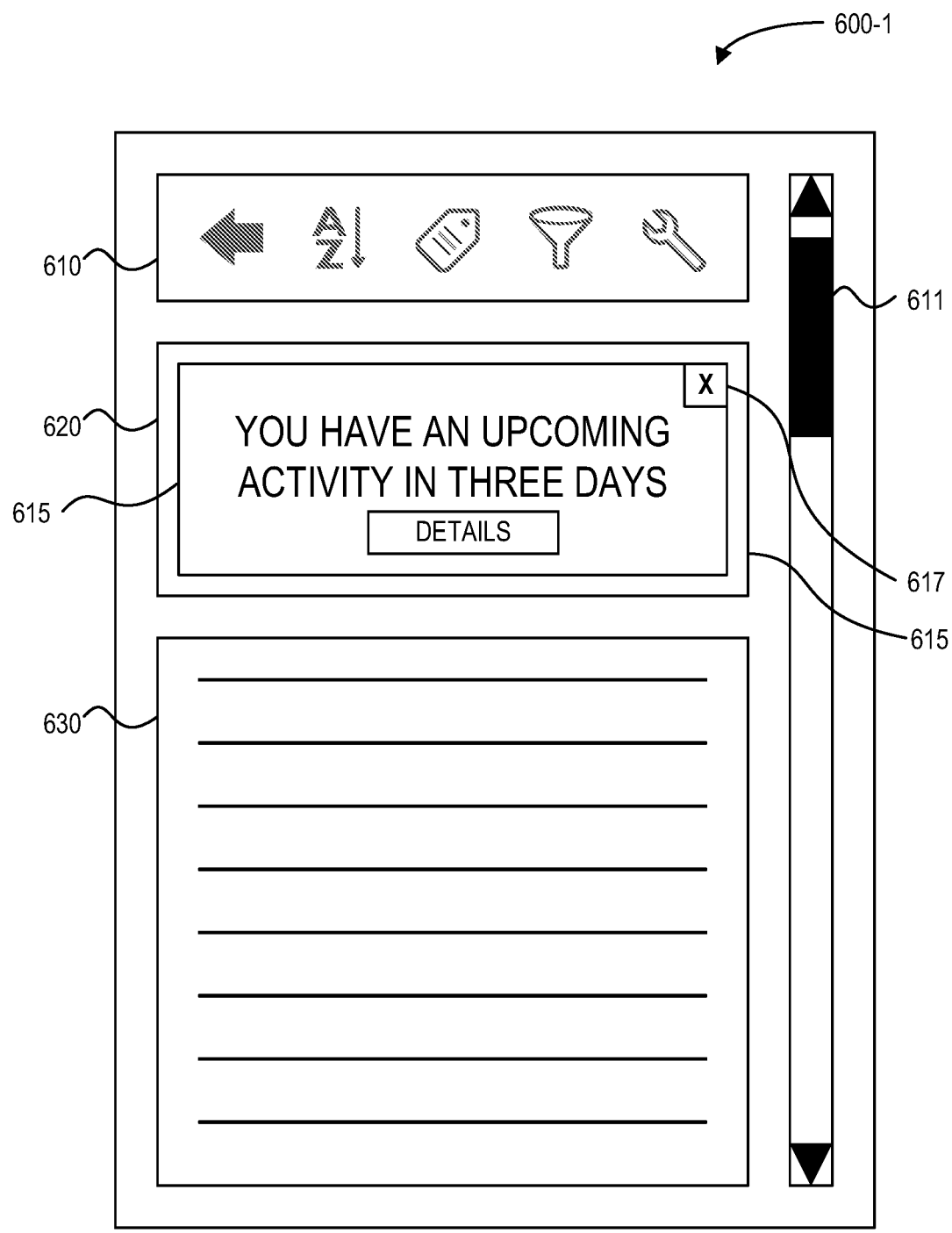
FIGS. 6A to 6D are illustrated example of a display screen in accordance with at least some embodiments.

The prompt may be displayed in a prominent target area that is positioned within the display such that it is at least partially visible prior to receipt of a scroll input. FIG. 6A illustrates a display screen, in accordance with an example embodiment. Display screen 600-1 has a target area 620 located in an upper portion of the display screen, below header 610, and above application content 630. Prompt 615 is displayed within the target area 610. Optionally, prompt 615 may have a dismiss button 617 for the user to dismiss the prompt from display, and thereby allow application content 630 to occupy more of the display screen. Display screen 600-1 may also have a scroll bar 611 to indicate a scroll position. In some cases, scroll bar 611 may appear when in use (i.e., the display is being scrolled) and disappear when not in use.

Figure 6B:
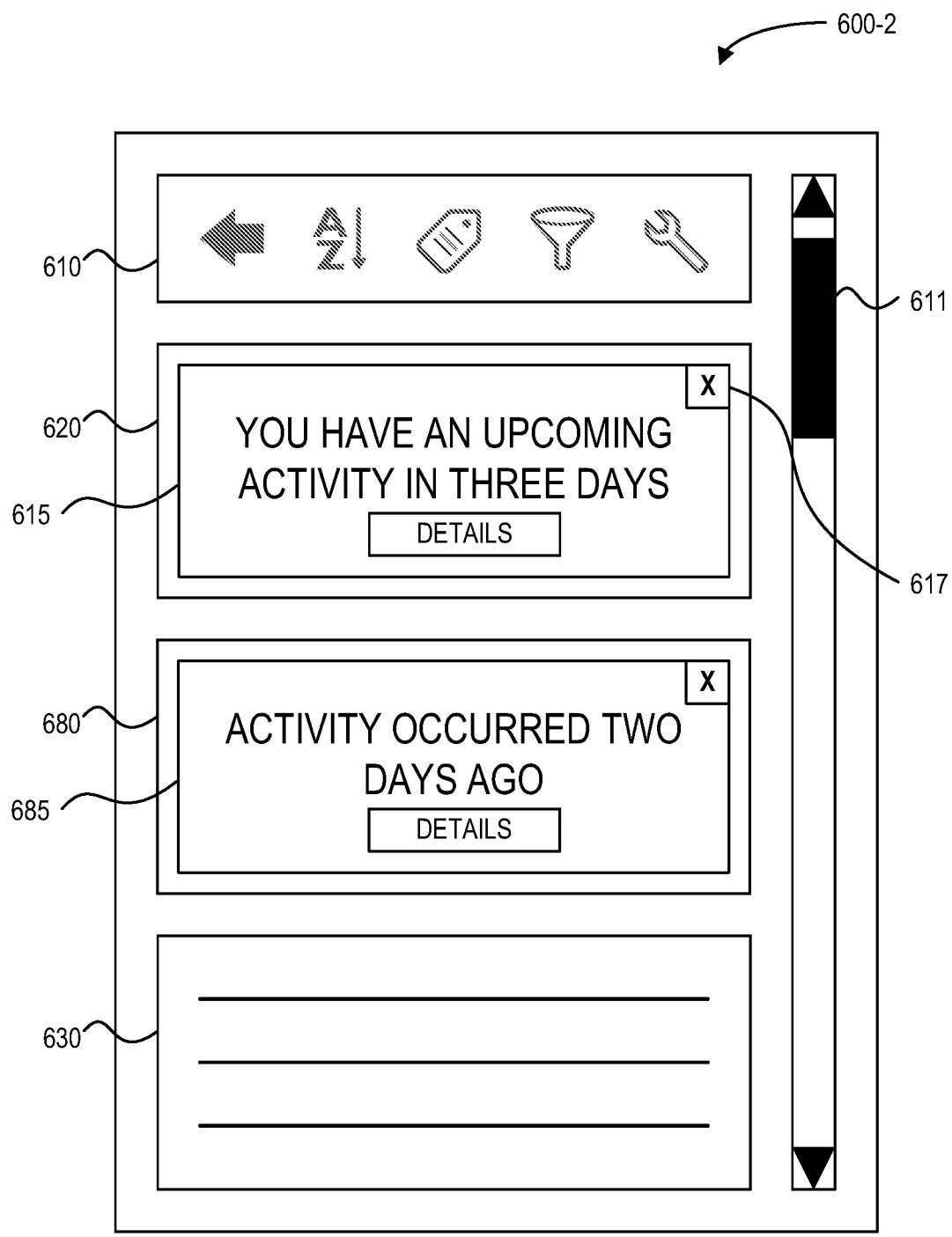

FIG. 6B illustrates another display screen, in accordance with another example embodiment. Display screen 600-2 is generally analogous to display screen 600-1, but differs in that it has a secondary target area 680 provided below the primary target area 620. Secondary target area 680 can be used to display a secondary prompt 685, or historical prompts (e.g., that previously occupied target area 620) that the user wishes to review.

In some cases, there may be multiple related prompts available for display to the user. In such cases, related prompts can be aggregated into an aggregated prompt for display in a target area, such as target area 620 or secondary target area 680. The aggregated prompt can be activated by the user to trigger the display of a summary screen containing details of the prompts related to the aggregated prompt.

Figure 6C:
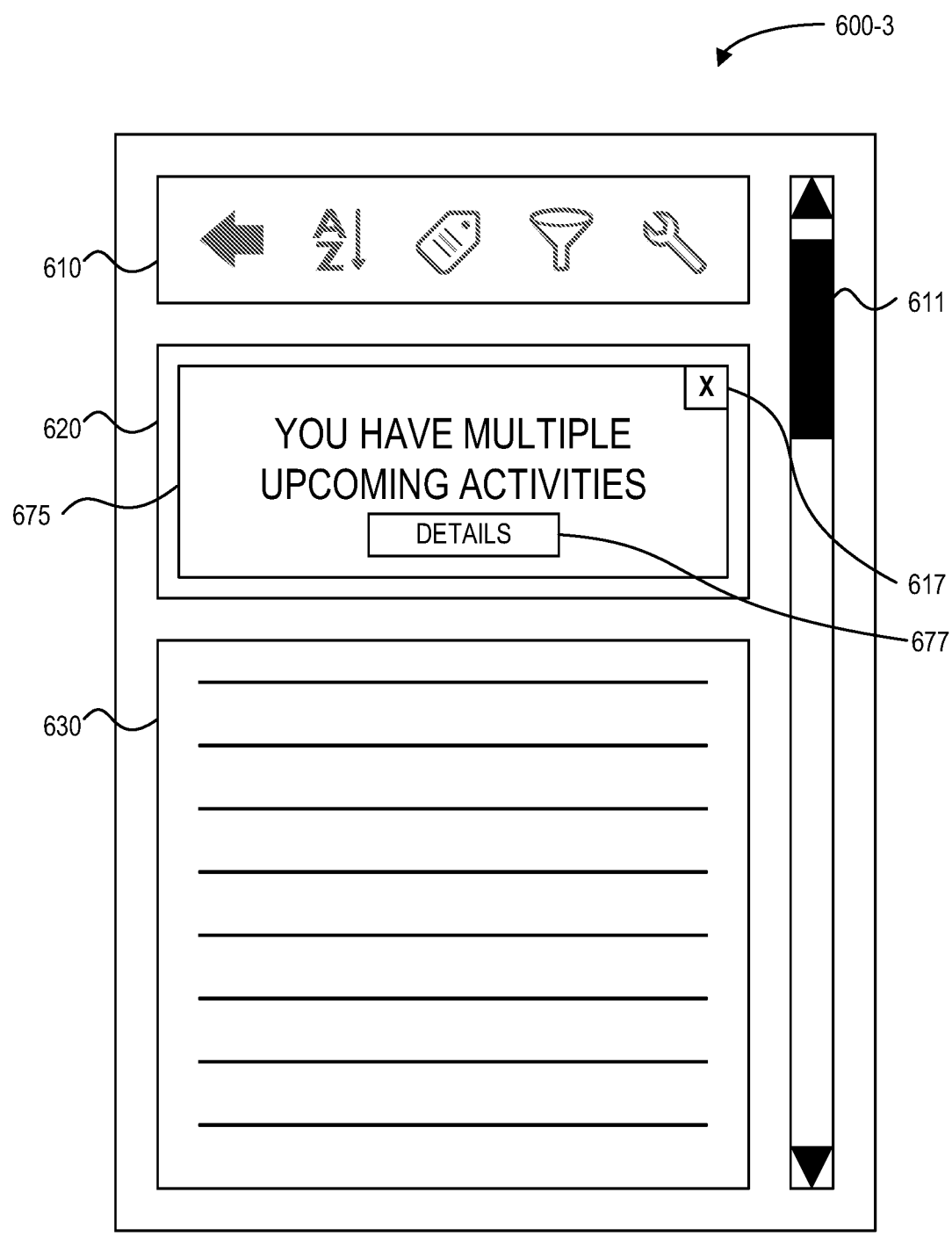
Figure 6D:
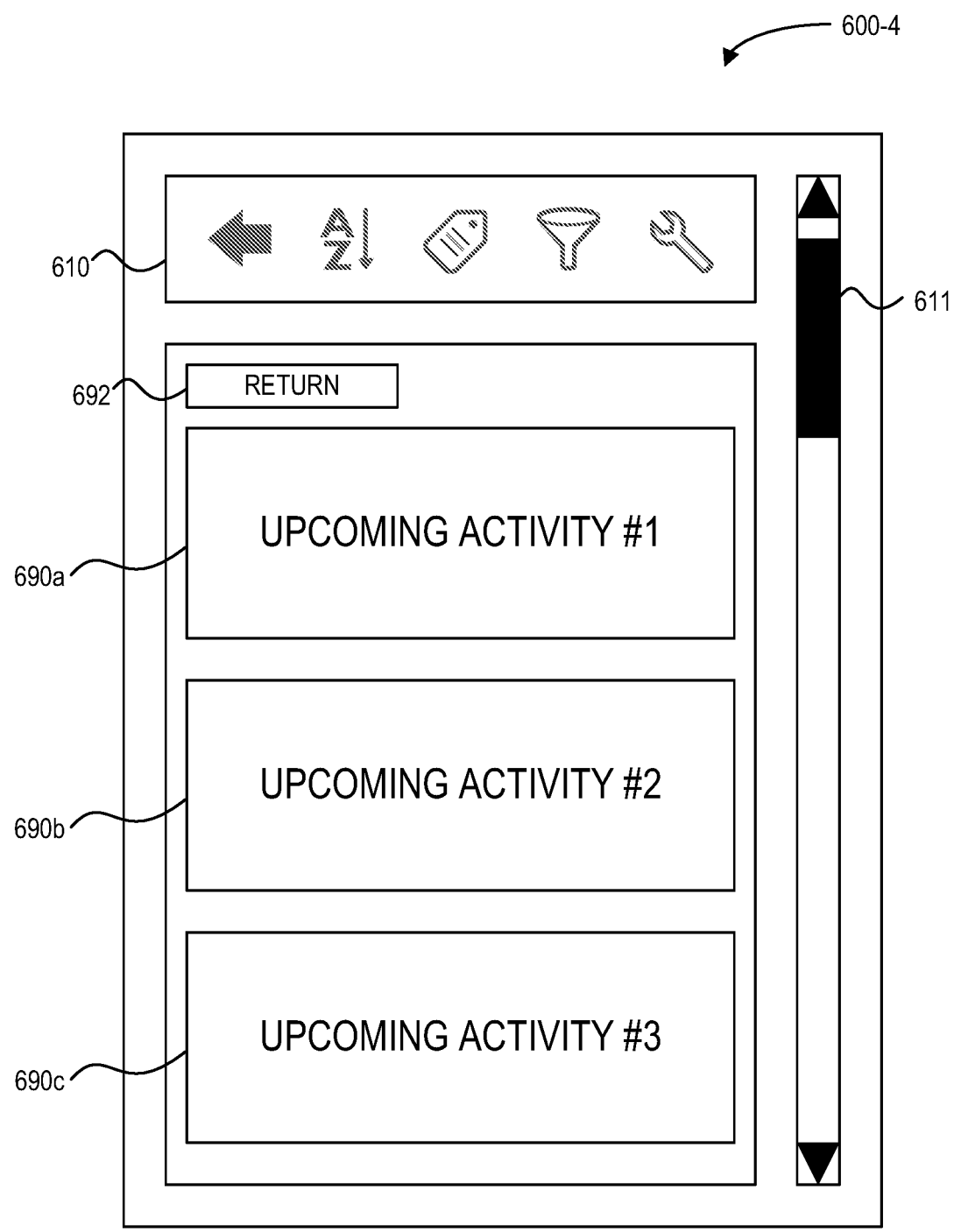

FIG. 6C illustrates a display screen, in accordance with another example embodiment. Display screen 600-3 is generally analogous to display screen 600-1 or 600-2, but differs in that the prompt 675 located within target area 620 is an aggregated prompt, and contains a details button 677 that can be activated to trigger display of a details screen 600-4. Details screen 600-4 is shown in FIG. 6D, and contains information from a plurality of prompts 690a, 690b, 690c, together with a dismiss button 692 that can be activated to return to the display of display screen 600-3.

As a non-limiting example, one upcoming activity that may be of use to some types of users is a bill payment predicted upcoming activity. For example, users may find it useful to have a mobile banking application identify upcoming bill payments based on past bill payments. In this context, bills may include periodic transactions such as monthly subscription payments, loan payments, insurance premiums, and other recurring charges, etc.

Although bill payment amounts may vary with each billing cycle, they may share certain characteristics, such as payee, mode of payment (e.g., pre-authorized debit from a bank account, pre-authorized payment from a credit card, external payments such as via a merchant website, or internal transfer between accounts at the same institution), payee category, recurrence frequency and timing, and an amount range. The described machine learning or fuzzy logic systems can identify related historical payments based on one or more characteristics that match a recurrence pattern (e.g., same payee, similar amount, within a similar period, etc.) and generate predictions of upcoming payments. For instance, the system may identify that payments are related despite different modes of payment being used. Accordingly, similar payments can be matched or aggregated together for presentation in a single prompt. Thus, a predicted upcoming activity may be an upcoming bill payment, and the data message or notification may relate to one or more upcoming bill payments. The type of prompt and its content may be determined based on the number of upcoming bill payments and/or their urgency.

In some cases, prompts for similar payments may not be aggregated, for instance, if a user preference exists not to aggregate some payments with others. In some cases, user may indicate their preferences to receive certain types of prompts, to prioritize certain types of prompts, or to aggregate (or not aggregate) certain types of prompts.

Referring now to FIG. 1A, there is illustrated a block diagram of an example computing system, in accordance with at least some embodiments. Computing system 100 has a source database system 110, an enterprise data provisioning platform (EDPP) 120 operatively coupled to the source database system 110, and a cloud-based computing cluster 130 that is operatively coupled to the EDPP 120.

Source database system 110 has one or more databases, of which three are shown for illustrative purposes: database 112a, database 112b and database 112c. Each of the databases of source database system 110 may contain confidential information that is subject to restrictions on export. One or more export modules 114 may periodically (e.g., daily, weekly, monthly, etc.) export data from the databases 112 to EDPP 120. In some cases, the export data may be exported in the form of comma separated value (CSV) data, however other formats may also be used.

EDPP 120, which may also be referred to as a publishing server, receives source data exported by the export modules 114 of source database system 110, processes it and exports the processed data to an application database within the cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to an application or group of applications (e.g., a client application) may be exported via reporting and analysis module 124 or an export module 126. In particular, parsed data can then be processed and transmitted to the cloud-based computing cluster 130 by a reporting and analysis module 124. Alternatively, one or more export modules 126 can export the parsed data to the cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of PII in the confidential data. Moreover, such "on-premises" systems typically are designed with access controls to limit access to the data, and thus may not be resourced or otherwise suitable for use in broader dissemination of the data. To comply with such restrictions, one or more module of EDPP 120 may "de-risk" data tables that contain confidential data prior to transmission to cluster 130. This de-risking process may, for example, obfuscate or mask elements of confidential data, or may exclude certain elements, depending on the specific restrictions applicable to the confidential data. The specific type of obfuscation, masking or other processing is referred to as a "data treatment."

Figure 1B:
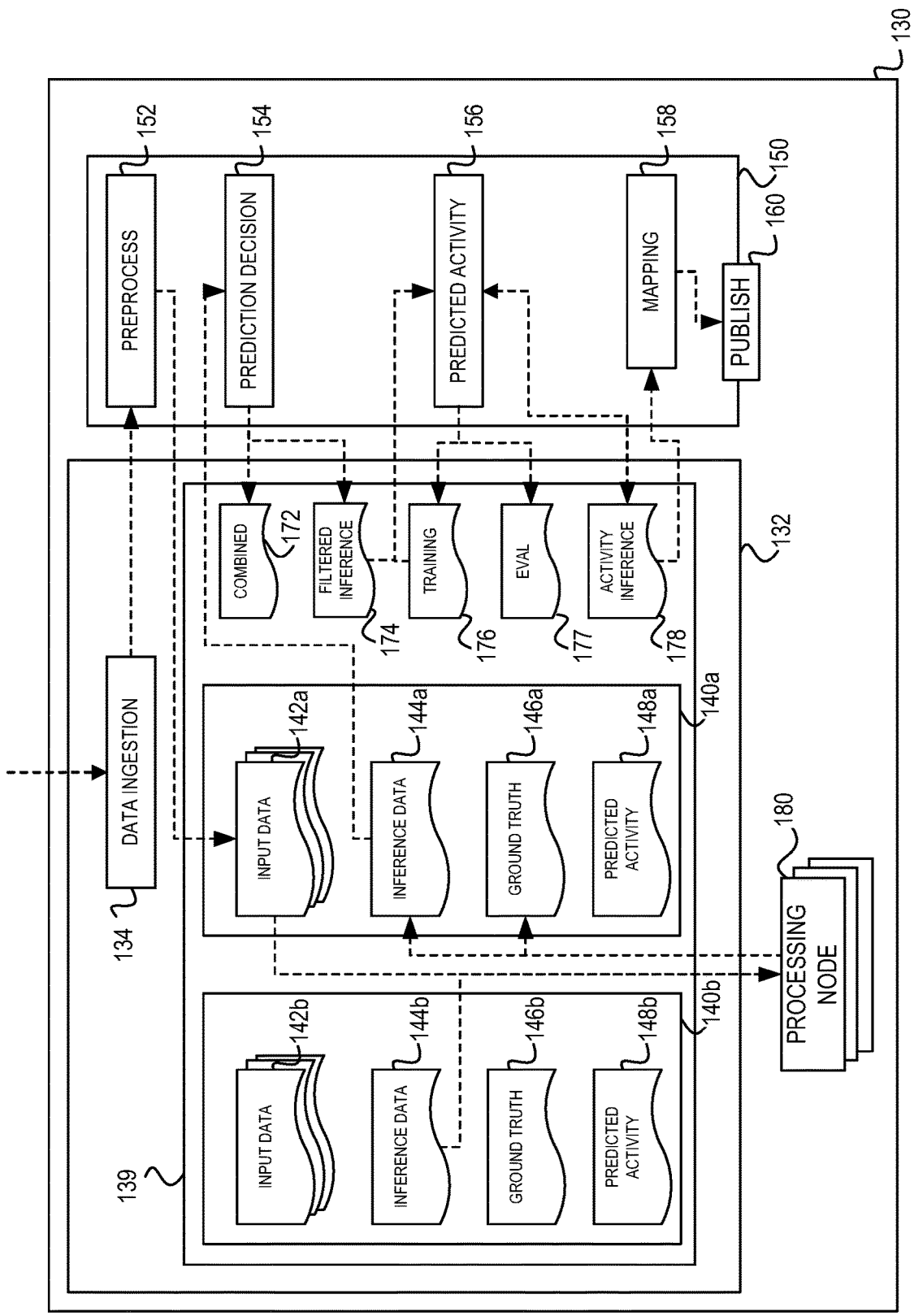
FIG. 1B is a schematic block diagram of a computing cluster of FIG. 1A in accordance with at least some embodiments.

Referring now to FIG. 1B, there is illustrated a block diagram of computing cluster 130, showing greater detail of the elements of the cluster, which may be implemented by computing nodes of the cluster that are operatively coupled.

Within cluster 130, both data received from reporting and analysis module 124 and data received from export modules 126 is ingested by a data ingestion module 134. Ingested data may be stored, e.g., in a distributed file system 132 such as the Hadoop Distributed File System (HDFS). HDFS can be used to implement one or more application database 139, each of which may contain one or more tables, and which may be partitioned temporally or otherwise.

For ease of illustration, only one application database 139 is shown, with two temporal partitions 140a and 140b depicted. However, additional application databases may be provided. Generally, the application database stores data, such as inference data from a machine learning model, the inference data having fields and records in tabular form.

Partition 140a is a current partition, corresponding to a current operation. Partition 140b is a partition corresponding to a previous run. Additional previous partitions may also be present. Each partition corresponds to a run of application data processing, such as an execution of a machine learning model. Data for and from each previous run may be stored in its own partition.

Each partition of application database 139 has one or more input data tables 142, and one or more inference data tables for storing inference data generated by execution of a machine learning model. Generally, a machine learning model can be executed by a node (or nodes) that has access to the application database. During execution, the node may retrieve information from the application database, perform processing to generate an output inference file, and store the output inference data in the appropriate table of the application database.

In the illustrated example embodiment, the inference data tables include an inference data table 144, a ground truth table 146, and a predicted activity table 148.

Input data table 142 contains input data that may be received directly from data ingestion module 134, or from preprocessing module 152 following preprocessing. Inference data table 144 stores inference data output by a processing node 180 following execution of a first machine learning model. Similarly, ground truth table 146 stores ground truth data output by the processing node 180 following execution of the first machine learning model. However, predicted activity table 148 stores inference data output by a processing node 150 following execution of an activity prediction machine learning model.

Application database 139 also includes one or more tables that may exist outside of temporal partitions in the distributed file system. In some cases, these tables may be implemented in Apache Hive™.

In some cases, processing node 150 may have a preprocessing module 152 for conditioning data from ingestion module 134. For example, in many cases, it may be desirable for input to a machine learning model to be preprocessed or otherwise conditioned prior to ingestion to the model.

Generally, the preprocessing module preprocesses input data in tabular form to generate preprocessed data. The preprocessing module 152 may perform several functions. It may preprocess data to, e.g., perform input validation, data normalization and filtering to remove unneeded data. For instance, data normalization may include converting alphabetic characters to all uppercase, formatting numerical values, trimming data, etc. In some cases, preprocessing module 152 may apply data treatments. Following preprocessing, the output of preprocessing module 152 may be stored in input data table 142, in the current partition of application database 139. In some cases, the output of preprocessing module 152 may also be stored in a Hive™ table (not shown).

In some cases, processing node 150 may have a prediction decision module 154 that retrieves or receives input data from inference data table 144 of the application database, processes the inference data to identify records that meet one or more predetermined threshold, and generates filtered inference data. For instance, for a first predetermined threshold, processing node 150 processes the inference data to identify records that meet the first predetermined threshold and adds a first threshold column to the filtered inference data, where for each record the field corresponding to the record row and first threshold column serves as an indication of whether the respective record meets the first predetermined threshold. Similarly, for a second predetermined threshold, processing node 150 processes the inference data to identify records that meet the second predetermined threshold and adds a second threshold column to the filtered inference data, where for each record the field corresponding to the record row and second threshold column serves as an indication of whether the respective record meets the second predetermined threshold. This process may be repeated for as many thresholds as are desired.

In some cases, the processing for a second or subsequent predetermined threshold may be optimized by processing only those records that meet a prior predetermined threshold.

Once the processing is completed, the filtered inference data can then be stored together with the original inference data in a single table 172. Alternatively, only those records that satisfy the one or more predetermined threshold may be stored in a filtered table 174.

Optionally, prediction decision module 154 may retrieve inference files generated by a machine learning model and perform analysis to determine whether individual records in the inference files meet one or more threshold requirements. The inference files may be in tabular form, with rows of data representing individual records, and columns that corresponding to fields.

The thresholding process may add one or more additional column to the inference data table to contain an indication of whether each record has met a particular threshold and thereby produce filtered inference data. If there is one threshold, then only one column may be added. If there is more than one threshold to be evaluated (e.g., for different downstream purposes), then multiple columns may be added. The value for each record in the threshold column may be binary to indicate whether the threshold of that column has been met. In some cases, a numerical score may be provided instead.

Various thresholds can be set. For example, a threshold may be an indication of whether each record belongs to a predetermined percentile of a desired metric, that is, whether a record falls within a certain percentile of all records under consideration for some metric, such as a numerical value. In one example, the desired metric may be a credit risk of a user, where each record corresponds to a single user. In such an example, the threshold may be set at the $95^{th}$ percentile, with the result that records of users who present a credit risk that is in the top 5% of all users will be flagged. The threshold can, of course, be set at different levels. As previously noted, multiple thresholds may also be set (e.g., $50^{th}$ percentile, $95^{th}$ percentile, $99^{th}$ percentile, etc.)

The thresholding process may involve employing a machine learning model configured to determine the category into which each record falls, or it may involve conventional processing.

Subsequently, further processing of the filtered inference data can be performed by other machine learning models or conventional processes. For example, a first process may take the filtered inference data, identify the records that have met a first predetermined threshold, and perform processing on only those records that have met the first predetermined threshold to generate first application data. A second process may take the filtered inference data, identify the records that have met a second predetermined threshold, and perform processing on only those records that have met the second predetermined threshold to generate second application data, and so forth.

In the illustrated example embodiments, processing node 150 has a predicted activity module 156 that receives input data and processes the data to generate predictions regarding activity, such as user activity. The input data may be filtered in some cases, whereas in other cases it is not. The further processing may therefore involve a prediction of an upcoming event or activity, that can generate recommendations for users who fall within a particular threshold.

For example, in one example embodiment, the input data contains user records that include information such as account balance information, recent account activity, and so forth. In some embodiments, the predicted activity module 156 may apply a machine learning model to analyze bill payment activity and identify upcoming bill payments based on user activity. In some other embodiments, the predicted activity module 156 may apply fuzzy logic to analyze bill payment activity and identify upcoming bill payments based on user activity.

The predicted activity module 156 outputs its prediction data to activity inference data table 178. Optionally, predicted activity module 156 also may output training and evaluation data to tables 176 and 177, where it can be used to improve the performance of the predicted activity module 156, if a machine learning model is being used.

The predicted activity module 156 may generate large output tables, which can contain millions of records. These tables are typically exported in comma-separated value (CSV) format, which can be hundreds of megabytes in size. In some cases, the output tables may contain data that can be used by multiple downstream applications, though each downstream application may only use a different subset of the data.

Some downstream applications may not be able to process data in CSV format, or else it may be inefficient to transmit large CSV files containing millions of records. In some cases, the downstream application may require additional data from other tables (e.g., ground truth data, biographic data from a database, other inferences, etc.). In such cases, transferring multiple CSV files would be inefficient and may not be possible for security reasons. Moreover, the downstream application may require data that is not contained in the model output, and it may be inefficient to modify the models to contain this data in the model output.

In some cases, downstream applications may expect to receive input in Javascript Object Notation (JSON) or Extensible Markup Language (XML) or other format. Accordingly, a mapping module 158 executes to ingest a first table and at least one additional table, which may be in the form of one or more CSV files, preprocess the data, and output a file (e.g., a JSON file) formatted according to the requirements of the downstream application. The downstream application may specify its requirements in a template, which is used by the mapping module 158 to process the records for the downstream application. The preprocessing may involve, e.g., performing join operations to join tables, synthesizing a data field using data from the first table and the at least one additional table, and other data transforms. The at least one additional table may contain inference data generated by one or more other machine learning models, and/or auxiliary data that is deterministic data. Deterministic data is data that is known about an item or individual, and is not synthesized using non-deterministic methods such as machine learning. Examples of deterministic data include, but are not limited to, metadata, biographical information, address information, objective facts, etc.

In one example, a downstream application may be configured to generate and transmit notifications to a plurality of user devices, e.g., regarding the output of the predicted activity module 156. Each individual predicted event may be referred to as a nudge. There may be more than one nudge per user generated in each run of the mapping module 158, accordingly the mapping module 158 may add priorities to nudges, such that the number of nudges sent within a predetermined period does not exceed a preset threshold (e.g., no more than one nudge per day to any given user).

In some cases, the mapping module 158 may also generate additional fields, such as a unique identifier, or data retrieved from other sources, or synthesized according to the requirements for the downstream application (e.g., custom content according to the type of nudge).

In one example embodiment, the mapping module 158 may be implemented in the PySpark framework, which enables processing by a cluster of nodes. Data is cached in memory and divided among nodes using a MapReduce algorithm. Writing of output is deferred until all processing is complete to avoid bottlenecks. Accordingly, a typical example run allows for several million records to be processed in approximately 10 minutes.

The mapping module 158 may also be configured with a plurality of pipelines, corresponding to different downstream applications with different templates and requirements, which can execute concurrently.

In some cases, the mapping module 158 may be adapted to generate output in circumstances where some inputs are not available. For instance, if the predicted activity module 156 did not produce an output for the desired period, the mapping module 158 may nevertheless produce an output using inference data, and vice versa.

The output of the mapping module 158 is sent to one or more respective downstream applications, via a publishing module 160, which can then act on the output to, e.g., distribute notifications corresponding to each nudge to the appropriate user devices 195.

Although processing node 150 is shown as one node, in practice its functions may be implemented by several nodes distributed throughout the cluster 130. Similarly, processing node 180 may be implemented by several nodes distributed throughout the cluster 130.

Referring again to FIG. 1A, in at least some embodiments, one or more downstream application server 190 may be operatively coupled to cluster 130, to application database 139, and client devices 195. The downstream application server may be a remote server, for example, that is configured to execute one or more downstream applications and thereby retrieve or receive data from the application database (e.g., as provided by the mapping module 158), process the data to generate notifications (e.g., corresponding to nudges), and transmit those notifications to the one or more user devices 195.

Figure 2:
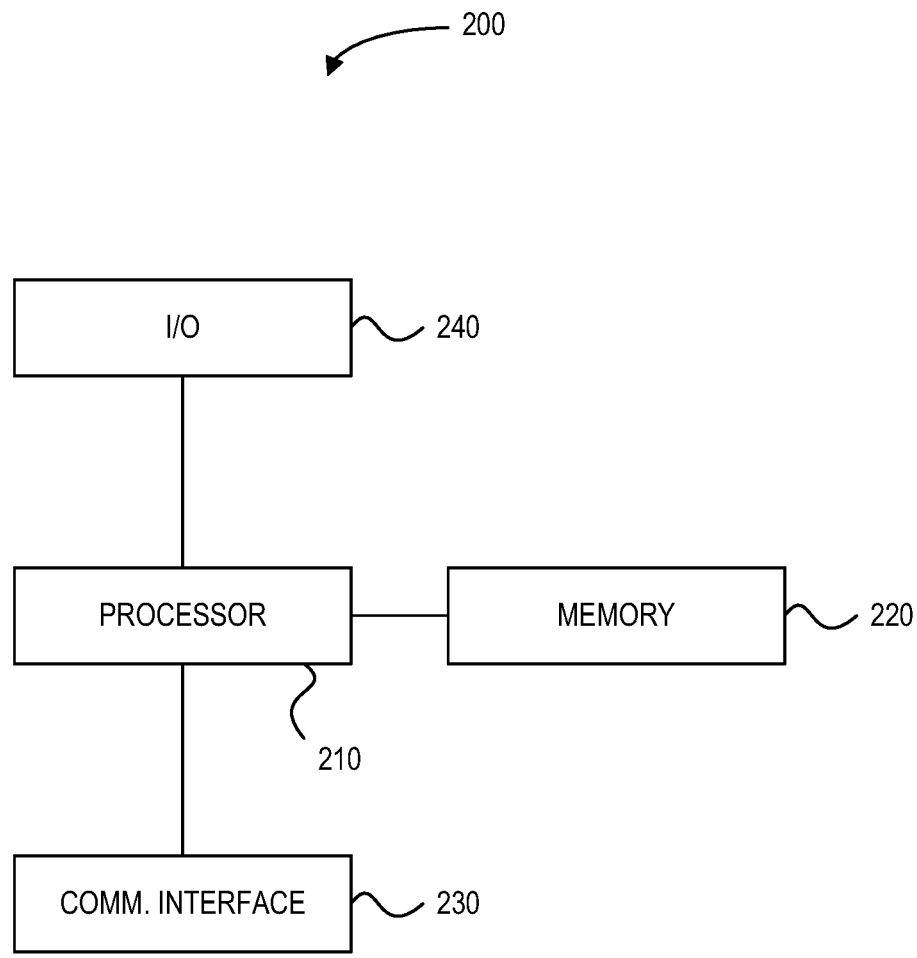
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as source database system 110, EDPP 120, processing node 150 or 180, server 190 or user device 195 of FIG. 1. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some implementations, computer 200 may be batch processing system that is generally designed and optimized to run a large volume of operations at once, and are typically used to perform high-volume, repetitive tasks that do not require real-time interactive input or output. Source database system 110 may be one such example. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks. Processing nodes 150 and 180 are examples of interactive systems, which are nodes in a distributed or cloud-based computing system.

Figure 3A:
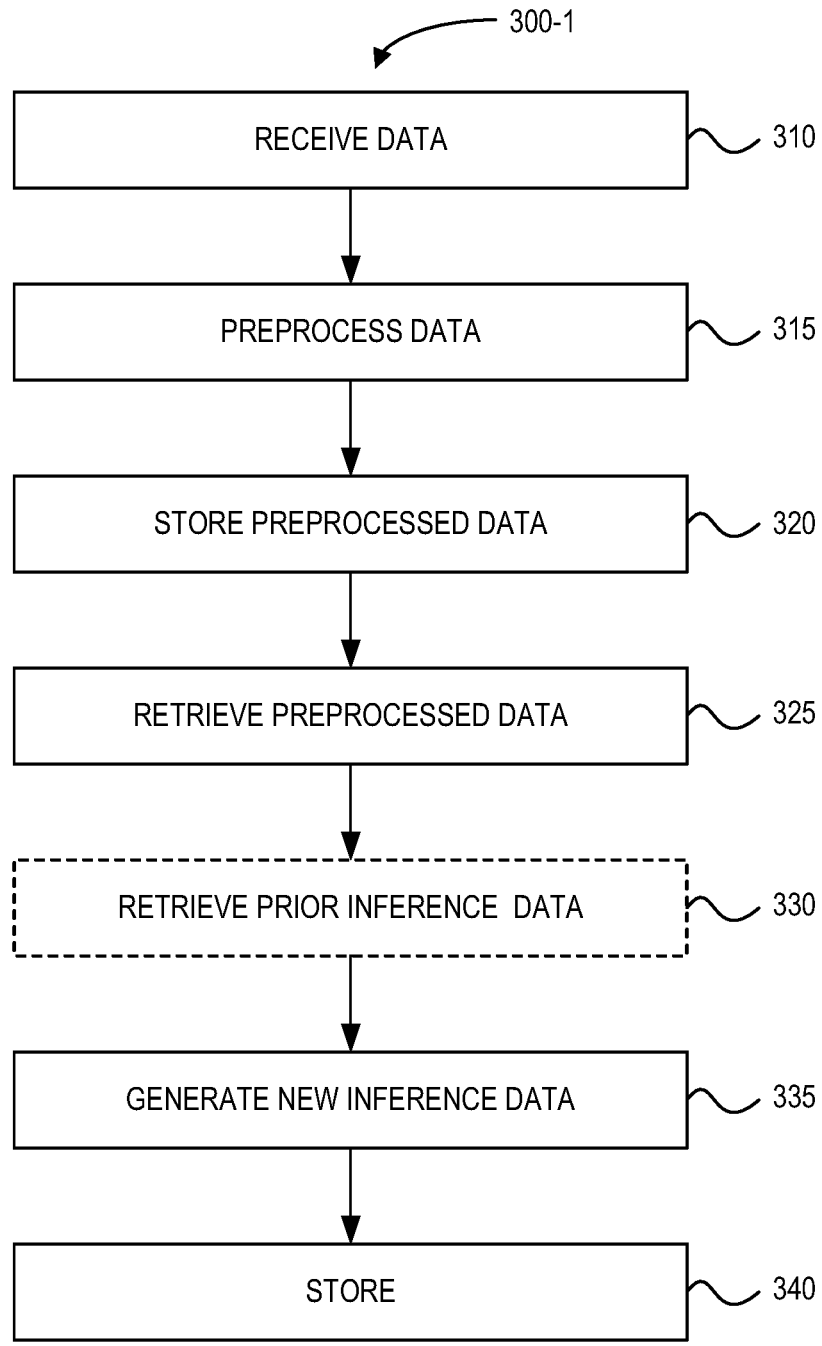
FIG. 3A is a flowchart diagram of an example method of preprocessing data and executing a machine learning model.

Referring now to FIG. 3A, there is illustrated a flowchart diagram of an example method of preprocessing data and executing a machine learning model in accordance with at least some embodiments. Method 300-1 may be carried out, e.g., by system 100 of FIG. 1.

Method 300-1 begins at 310 with a processor, such as a processor of processing node 150, receiving data from distributed file system 132 and/or data ingestion module 134.

At 315, preprocessing module 152 is executed by the processor to take input data from the distributed file system, e.g., in tabular form, and generate preprocessed data. As described elsewhere herein, the preprocessing module preprocesses input data in tabular form to generate preprocessed data. The preprocessing may involve, e.g., input validation, data normalization and filtering to remove unneeded data. For instance, data normalization may include converting alphabetic characters to all uppercase, formatting numerical values, trimming data, etc. In some cases, preprocessing module 152 may apply data treatments.

At 320, following preprocessing, the preprocessed data may be stored in an application database of the distributed file system. For example, the preprocessed data may be stored in an input data table 142a, in the current partition of application database 139.

At 325, a machine learning node, such as processing node 180, retrieves the preprocessed data from the input data table 142a. Optionally, depending on the machine learning model, the processing node 180 may retrieve additional data at 330, such as inference data from a prior run of process 300-1, process 300-2, or both.

At 335, the processing node executes a machine learning model on the retrieved data to generate inference data and, at 340, the output inference data is stored in the appropriate table or tables of the application database, such as inference data table 144a or ground truth table 146a.

Figure 3B:
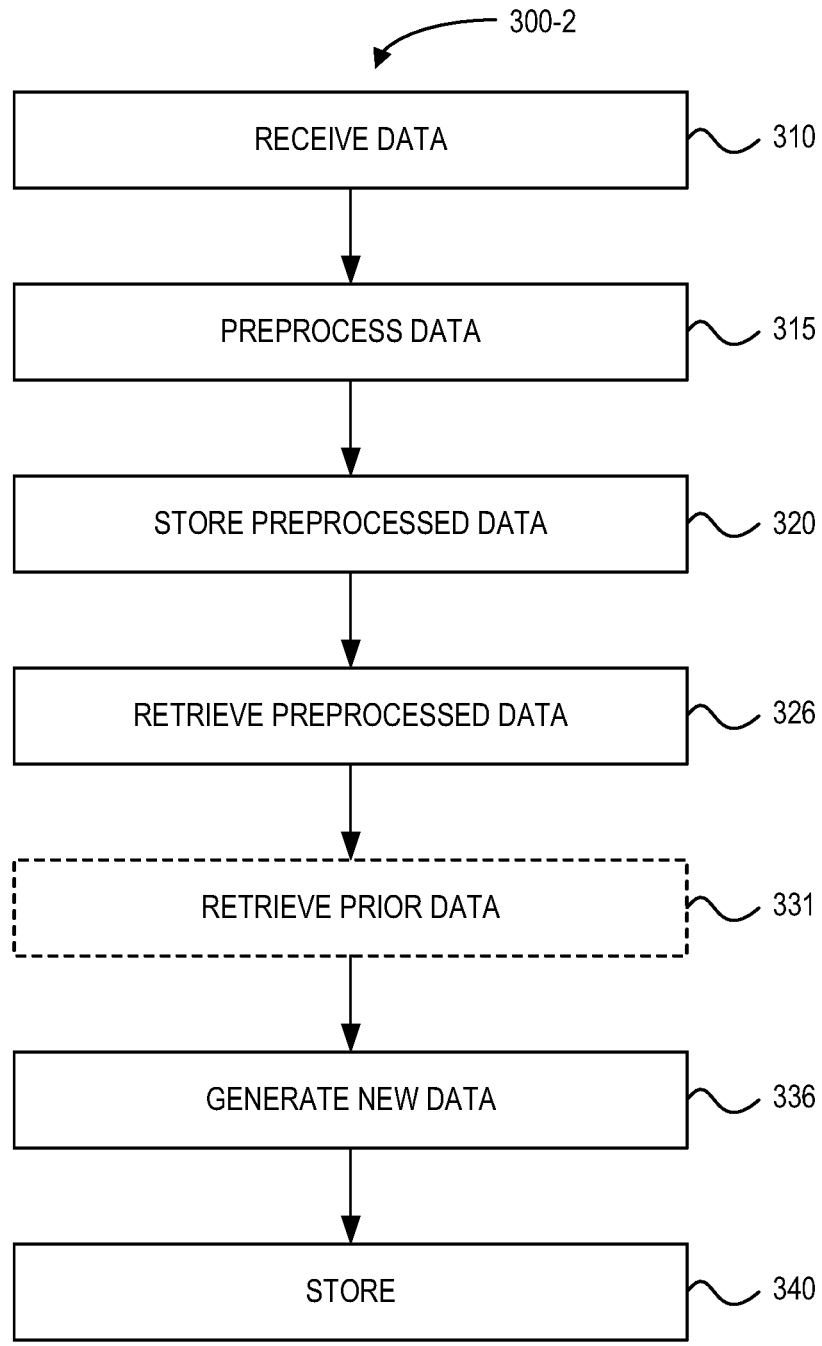
FIG. 3B is a flowchart diagram of an example method of preprocessing data and executing fuzzy logic processing.

Referring now to FIG. 3B, there is illustrated a flowchart diagram of an example method of preprocessing data and generating predictions using fuzzy logic in accordance with at least some embodiments. Method 300-2 may be carried out, e.g., by system 100 of FIG. 1.

Method 300-2 begins at 310 with a processor, such as a processor of processing node 150, receiving data from distributed file system 132 and/or data ingestion module 134.

At 315, preprocessing module 152 is executed by the processor to take input data from the distributed file system, e.g., in tabular form, and generate preprocessed data. As described elsewhere herein, the preprocessing module preprocesses input data in tabular form to generate preprocessed data. The preprocessing may involve, e.g., input validation, data normalization and filtering to remove unneeded data. For instance, data normalization may include converting alphabetic characters to all uppercase, formatting numerical values, trimming data, etc. In some cases, preprocessing module 152 may apply data treatments.

At 320, following preprocessing, the preprocessed data may be stored in an application database of the distributed file system. For example, the preprocessed data may be stored in an input data table 142a, in the current partition of application database 139.

At 326, a node, such as processing node 180, retrieves the preprocessed data from the input data table 142a. Optionally, depending on the fuzzy logic rules, the processing node 180 may retrieve additional data at 331, such as inference data from a prior run of process 300-1, process 300-2, or both.

At 336, the processing node executes fuzzy logic rules on the retrieved data to generate output data and, at 340, the output data is stored in the appropriate table or tables of the application database, such as inference data table 144a or ground truth table 146a, or a prediction table (not shown).

Figure 4:
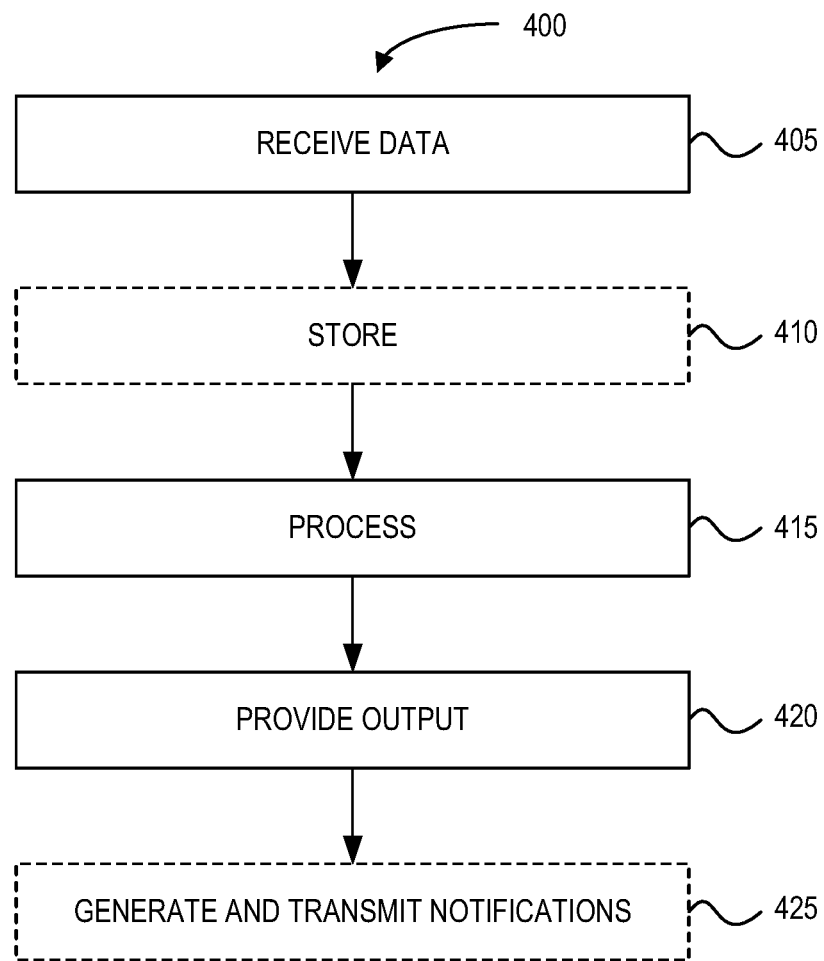
FIG. 4 is a flowchart diagram of an example method of optimizing data processing in a distributed computing environment in accordance with at least some embodiments.

Referring now to FIG. 4, there is illustrated a flowchart diagram of a method of optimizing processing for one or more downstream applications in accordance with at least some embodiments. Method 400 may be carried out, e.g., by system 100 of FIG. 1 and, in particular by mapping module 158 and server 190. In at least some cases, method 400 may continue from 335 or 340 of method 300-1, or 370 or 390 of method 300-2.

Method 400 begins at 405 with a processor, such as a processor of processing node 150, executing a mapping module 158 to receive inference data originally generated by a machine learning model. The inference data may be in tabular form. In some cases, the inference data may have been generated, e.g., at 335 of method 300-1, or at 336 of method 300-2.

Optionally, if the inference data has not been stored in the application database, then at 410, the inference data is stored in a first table of the application database. The application database may contain at least one additional table storing, e.g., other inference data from a different model or a previous run of the same model, or deterministic data.

At 415, the processor executes a mapping module to process the first table and the at least one additional table based on a template corresponding to a downstream application. The processing may include, e.g., join operations, synthesizing data fields using data from the first table and the at least one additional table, joining data produced by another machine learning model, joining data from an auxiliary data table that stores deterministic data, and/or joining metadata regarding one or more users. The processing generates an output table corresponding to the downstream application. Each record of the output table may have a unique identifier generated for each record in the output table.

At 420, the output table may be provided to the corresponding downstream application, which may act on the data in the output table to, e.g., generate and transmit notifications to user devices at 425. In some cases, rather than providing the entire output table to the downstream application, the processor may generate and transmit individual items of data corresponding to individual user devices, e.g., that are to receive a notification.

There may be a plurality of downstream applications that perform unique processing of the inference data, based on different subsets or combinations of subsets of inference data, or filtered inference data. Accordingly, method 400 may be executed concurrently by a plurality of mapping modules or processors, to concurrently produce output tables corresponding to a plurality of downstream applications, each based on respective templates.

Figure 5:
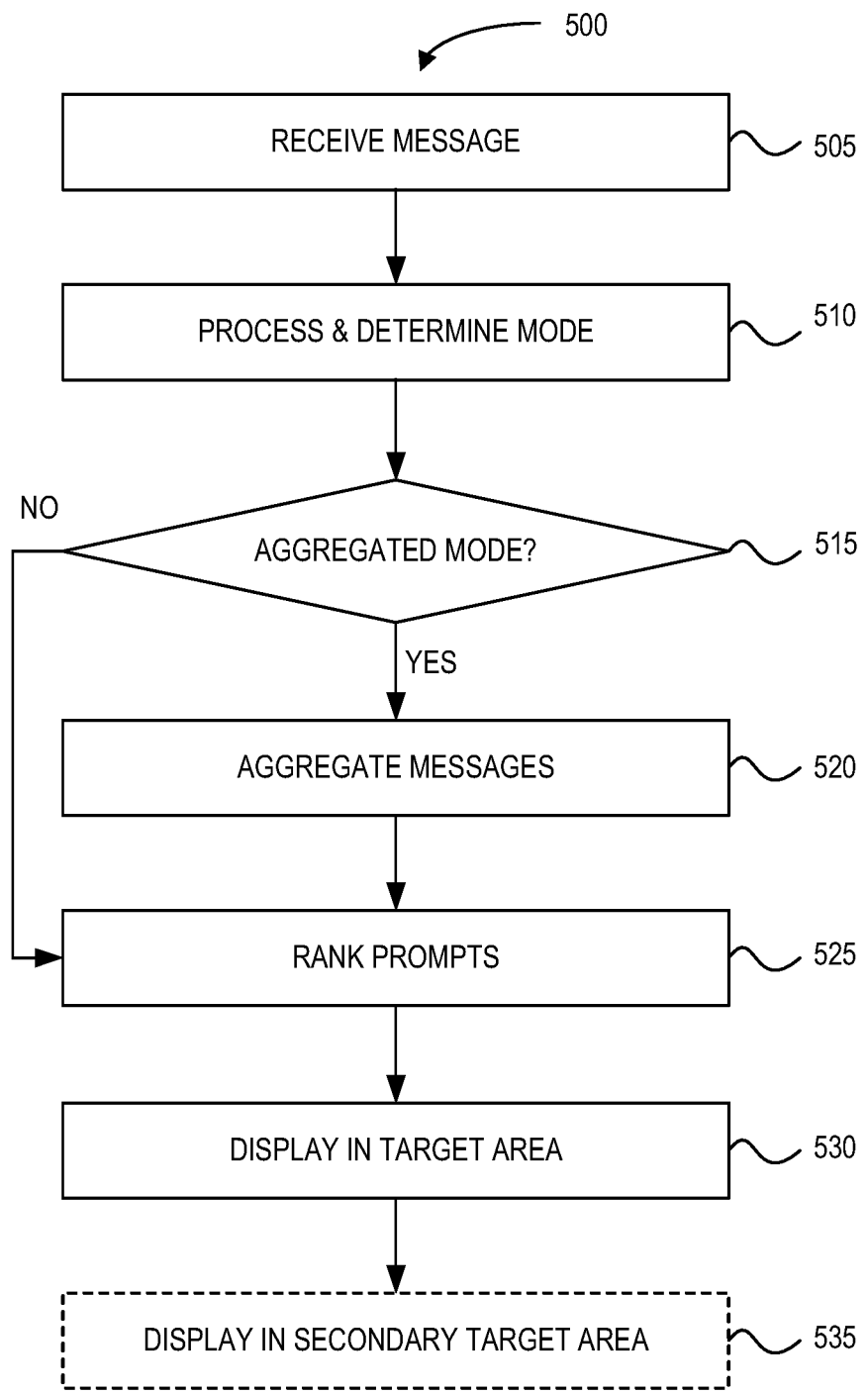
FIG. 5 is a flowchart diagram of a method of displaying a prompt within a user interface in accordance with at least some embodiments.

Referring now to FIG. 5, there is illustrated a flowchart diagram of a method of displaying a prompt within a user interface in accordance with at least some embodiments. Method 500 may be carried out, e.g., by user device 195 of FIG. 1. In at least some cases, method 400 may continue from 425 of method 400. In some alternative embodiments, portions of method 500 may be carried out server-side, e.g., by server 190 or computing cluster 130, in which case only the acts of displaying need be carried out by user device 195.

Method 500 begins at 505 with a processor, such as a processor of device 195, executing a mapping module 158 to receive a data message or notification. The message may be received, e.g., from server 190, as transmitted at 425 of method 400. As described herein, the message comprises a predicted upcoming activity, or a plurality of predicted upcoming activities.

At 510, the message is processed to determine a presentation mode that is to be used for displaying a prompt regarding contents of the message. For example, if the message contains a single predicted upcoming activity, a non-aggregated presentation mode may be selected. In another example, if the message contains a plurality of predicted upcoming activities, an aggregated presentation mode may be selected to display an aggregated prompt generated based on the plurality of predicted upcoming activities.

At 515, the processor determines if the aggregated presentation mode has been selected and, if yes, proceeds to 520 to generate an aggregated prompt based on the plurality of predicted upcoming activities. Otherwise, the processor proceeds to 525 to rank prompts. Ranking may comprise determining and sorting according to an urgency level, priority level or predetermined order of preference for certain prompts and/or their corresponding predicted upcoming activities. In the case of an aggregated prompt, the ranking may also comprise determining and sorting messages within the aggregated prompt. Once the ranking is completed, a topmost prompt (or aggregated prompt) is selected.

At 530, when a first presentation mode is selected, the selected prompt is displayed in a target area of the display, as described herein. The selected prompt may have the highest urgency, priority or preference level as determined during ranking. Generally, the target area—which may be referred to as the primary target area—is positioned within the display such that it is at least partially visible prior to receipt of a scroll input, particularly when the display is a display of a mobile device, which may have a diagonal size of less than about 10". For example, the mobile device may be a mobile phone, tablet computer or smart watch.

Optionally, at 535, a second presentation mode may be selected for a prompt that has a secondary urgency, priority or preference level, as compared to the prompt selected for display in the target area at 530. In the second presentation mode, a secondary target area, subordinate to the primary target area, is used to display the secondary prompt. In some cases, the secondary prompt may comprise historical prompts (e.g., prompts that were previously displayed in the primary target area).

The described embodiments generally provide for obtaining predictions of upcoming activities from multiple sources, making a determination as to how the predictions should be presented (e.g., as individual prompts or aggregated prompts) and then presenting these prompts in order to optimize the user interface to require the least number of steps for the user to access the information most relevant to them.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

We claim:

1. A computing device, the computing device comprising:
a display;
a network interface;
a memory; and
a processor coupled to the display, the network interface, and the memory, the processor configured to:
receive via the network interface a data message comprising a plurality of predicted upcoming activities;
process the plurality of predicted upcoming activities to automatically determine a presentation mode, selected from a first presentation mode and a second presentation mode, to be used for displaying a prompt regarding at least one of the plurality of predicted upcoming activities, wherein when the presentation mode is a first presentation mode, the prompt is an aggregated prompt summarizing the plurality of predicted upcoming activities, and, when the presentation mode is a second presentation mode, the prompt is an individual prompt based on a prioritized one of the plurality of predicted upcoming activities determined by ranking the plurality of predicted upcoming activities; and
display the prompt on the display according to the determined presentation mode.

2. The computing device of claim 1, wherein the presentation mode designates a target area of the display for the prompt, wherein the target area is positioned within the display such that it is at least partially visible prior to receipt of a scroll input.

3. The computing device of claim 2, wherein the computing device includes a mobile device, and wherein the display has a diagonal size of less than about 10".

4. The computing device of claim 3, wherein the mobile device includes one of a mobile phone, a tablet device and a smart watch.

5. The computing device of claim 1, wherein the presentation mode is the first presentation mode optimized for display of the aggregated prompt.

6. The computing device of claim 1, wherein the processor is further configured to rank the plurality of predicted upcoming activities based on a predetermined order of preference.

7. The computing device of claim 1, wherein the processor is further configured to rank the plurality of predicted upcoming activities based on an urgency level of each of the plurality of predicted upcoming activities.

8. The computing device of claim 1, wherein the presentation mode is the second presentation mode optimized for display of the prompt based on the prioritized one of the plurality of predicted upcoming activities.

9. The computing device of claim 1, wherein the processor is further configured to display a second prompt subordinate to the prompt, wherein the second prompt consists of historical prompts.

10. A method for displaying a prompt within a user interface, the method comprising:
receiving a data message comprising a plurality of predicted upcoming activities;
processing the plurality of predicted upcoming activities to automatically determine a presentation mode, selected from a first presentation mode and a second presentation mode, to be used for displaying a prompt regarding at least one of the plurality of predicted upcoming activities, wherein when the presentation mode is a first presentation mode, the prompt is an aggregated prompt summarizing the plurality of predicted upcoming activities, and, when the presentation mode is a second presentation mode, the prompt is an individual prompt based on a prioritized one of the plurality of predicted upcoming activities determined by ranking the plurality of predicted upcoming activities; and
displaying the prompt according to the determined presentation mode.

11. The method of claim 10, wherein the presentation mode designates a target area of a display for the prompt, wherein the target area is positioned within the display such that it is at least partially visible prior to receipt of a scroll input.

12. The method of claim 11, wherein the display includes a display of a mobile device, and wherein the display has a diagonal size of less than about 10".

13. The method of claim 12, wherein the mobile device includes one of a mobile phone, a tablet device and a smart watch.

14. The method of claim 10, wherein the presentation mode is the first presentation mode optimized for display of the aggregated prompt.

15. The method of claim 10, wherein the ranking of the plurality of predicted upcoming activities is based on a predetermined order of preference.

16. The method of claim 10, wherein the ranking of the plurality of predicted upcoming activities is based on an urgency level of each of the plurality of predicted upcoming activities.

17. The method of claim 10, wherein the presentation mode is the second presentation mode optimized for display of the prompt based on the prioritized one of the plurality of predicted upcoming activities.

18. The method of claim 10, further comprising displaying a second prompt subordinate to the prompt, wherein the second prompt consists of historical prompts.

19. A non-transitory computer readable medium storing computer executable instructions which, when executed by a computer processor, cause the computer processor to carry out a method of displaying a prompt within a user interface, the method comprising:
receiving a data message comprising a plurality of predicted upcoming activities;
processing the plurality of predicted upcoming activities to automatically determine a presentation mode, selected from a first presentation mode and a second presentation mode, to be used for displaying a prompt regarding at least one of the plurality of predicted upcoming activities, wherein when the presentation mode is a first presentation mode, the prompt is an aggregated prompt summarizing the plurality of predicted upcoming activities, and, when the presentation mode is a second presentation mode, the prompt is an individual prompt based on a prioritized one of the plurality of predicted upcoming activities determined by ranking the plurality of predicted upcoming activities; and
displaying the prompt according to the determined presentation mode.

* * * * *